US009752586B2

United States Patent
Feldmann et al.

(10) Patent No.: US 9,752,586 B2
(45) Date of Patent: Sep. 5, 2017

(54) LINEAR ENGINE FOR COMPRESSOR AND COMPRESSOR PROVIDED WITH A LINEAR ENGINE

(75) Inventors: Alberto Bruno Feldmann, Joinville (BR); Flavio J. H. Kalluf, Joinville (BR)

(73) Assignee: Whirlpool S.A., Sao-Paulo (BR)

( * ) Notice: Subject to any disclaimer, the term of this patent is extended or adjusted under 35 U.S.C. 154(b) by 752 days.

(21) Appl. No.: 14/233,591

(22) PCT Filed: Jul. 17, 2012

(86) PCT No.: PCT/BR2012/000243
§ 371 (c)(1),
(2), (4) Date: Apr. 25, 2014

(87) PCT Pub. No.: WO2013/010236
PCT Pub. Date: Jan. 24, 2013

(65) Prior Publication Data
US 2014/0241916 A1    Aug. 28, 2014

(30) Foreign Application Priority Data

Jul. 20, 2011    (BR) .................................... 1103496

(51) Int. Cl.
*F04D 25/06*    (2006.01)
*F04B 35/04*    (2006.01)
*H02K 41/03*    (2006.01)

(52) U.S. Cl.
CPC ............ *F04D 25/06* (2013.01); *F04B 35/045* (2013.01); *H02K 41/03* (2013.01)

(58) Field of Classification Search
CPC ........ H02K 41/03; F04B 25/06; F04B 35/045

USPC ............................................... 310/14, 34, 30
See application file for complete search history.

(56) References Cited

U.S. PATENT DOCUMENTS

| 5,261,799 A | 11/1993 | Laskaris | |
|---|---|---|---|
| 6,453,761 B1* | 9/2002 | Babinski | H02K 7/06 29/898.06 |
| 6,491,140 B2* | 12/2002 | Usui | F16D 65/18 188/158 |
| 2004/0245863 A1 | 12/2004 | Hong et al. | |
| 2006/0250031 A1 | 11/2006 | Kim | |
| 2013/0334912 A1* | 12/2013 | Tokunaga | H02K 9/19 310/54 |

FOREIGN PATENT DOCUMENTS

JP    2000 139046 A    5/2000

OTHER PUBLICATIONS

International Search Report for International Application No. PCT/BR2012/000243 mailed Nov. 9, 2012.

* cited by examiner

*Primary Examiner* — Terrance Kenerly
(74) *Attorney, Agent, or Firm* — Harrington & Smith

(57) ABSTRACT

The present invention refers to a linear engine for compressor, and to a compressor provided with a linear engine. The linear engine for compressor comprises at least a stator consisting of a first core (2) and a second core (3), and at least a cursor (4), wherein said first core (2), cursor (4) and second core (3) are concentrically disposed. Said first core (2) is substantially defined by at least two different bodies (21, 22) and provides attaching means (6, 7) between said two bodies (21, 22).

10 Claims, 5 Drawing Sheets

LINEAR ENGINE FOR COMPRESSOR AND COMPRESSOR PROVIDED WITH A LINEAR ENGINE

RELATED APPLICATIONS

The subject application is a U.S. National Stage Application of International Application No. PCT/BR2012/000243, filed on 17 Jul. 2012, which claims the priority of Brazil Patent Application No.: PI1103496-3, filed on 20 Jul. 2011, the contents of which are herein incorporated by reference in its entirety.

FIELD OF THE INVENTION

The present invention refers to a linear engine for compressor, and to a compressor provided with a linear engine. More specifically, the present invention refers to an arrangement of a linear engine for compressor and a compressor provided with means for supporting and securing a linear engine.

BACKGROUND OF THE INVENTION

Linear engines comprise electric machines, capable of converting electric energy to mechanical energy in the form of translation movement, preferably axial movement (along an imaginary axis).

By this way, and differently from rotary engines, linear engines are capable of producing linear movement with no need for mechanical couplings such as belts, clutch assemblies, and similar devices. In this regard, a linear engine comprises a static (fixed) portion and dynamic (moving) portion.

According to specialized literature, functioning of a linear engine is analogous to the functioning of a rotary engine, where an electromagnetic force (generated by interaction between a current applied to the engine coil and a magnetic field) shifts the engine dynamic (or moving) portion in relation to the engine static (or fixed) portion.

Among possible designs of linear engines known from the state of the art, it can be cited a linear engine which static (or fixed) portion thereof includes three iron cores (wherein only a central core has a coil) and the dynamic (or moving) portion consists of three permanent magnets disposed between said iron cores.

This design can also be implemented in linear compressors where displacement of dynamic (or moving) portion of linear engine is functionally associated with the piston (which is reciprocately moved inside a piston, thereby compressing a working fluid).

Example of a linear engine-based linear compressor is disclosed in BR Patent Application PI 0401581-9. This document refers to a linear engine comprising a stator (containing a concentrically arranged core and coil) and a cursor, wherein said cursor is secured (even indirectly) to the compressor carcass, and said cursor is functionally associated with the compressor piston. More specifically, said stator is formed by an outer ring (coil) and an inner ring (ferrous core), wherein both are indirectly fixed to the compressor carcass by suspension means. With regard to the linear engine cursor, which is located between the outer ring and inner ring of the stator, same is formed by a magnet ring integrated into a support guide (which is also associated with the piston). Further, in accordance with this document, it is observed that said cursor may physically contact the outer face of the stator core.

Another example of a linear engine-based linear compressor is described in BR Patent Application PI 9801434-0, which focus on a linear engine structure itself, which improves engine efficiency and simplifies assembling of a lamination (set of "C"-shaped metal blades), whereby said lamination is attached by a fixation ring and not by a welding process. According to this document, a linear engine includes lamination wherein protruding portions respectively comprise a groove formed by concentric circles of radially disposed iron parts, a connector for coil wires and a non-magnetic fixation ring disposed at the groove to prevent said iron parts from being loosened.

Although said BR Patent Applications No. PI 0401581-9 and PI 9801434-0 comprise mere examples of linear engines (for linear compressors) pertaining to the state of the art, it should be noted that most linear engines (for linear compressors) are basically similar, at least conceptually, to the referred to examples.

That is, most linear engines (for linear compressors) already known from the state of the art comprise an essential design based on stator of concentric rings and cursor located between the concentric rings of the stator. It is also observed that most linear engines (for linear compressors) have its coil wound by metal laminations (juxtaposed laminar metal sheets).

Furthermore, it is also known that most linear engines (for linear compressors) are indirectly attached to the compressor carcass by means of suspensions and the like, or also by means of the block itself that defines a compression cylinder.

These two conventional aspects observed in linear engines (for linear compressors) can be construed as aspects capable of being improved because:

Forming of metal laminations for winding coils, in addition to rendering electric insulation of the assembly unsafe, a complex productive forming and mounting method is required.

Fixation of a linear engine to a compressor carcass (by the means cited above), in addition to making electric insulation of the assembly unsafe, it may cause structural damages to other compressor parts, such as, for example, a block that defines a compression cylinder.

Within the context explained above, it should be noted that there is a need for developing a linear engine for linear compressor which does not present such drawbacks and which is capable of being improved.

OBJECTS OF THE INVENTION

Hence, one object of the present invention is to provide a linear engine (for compressor) free of the conventional sets of metal blades which define a coil winding region.

In this regard, another object of the present invention is to provide a stator comprising an easily assembled magnetic core (for winding coils).

By this way, one object of the present invention is to provide a linear engine comprising a stator having at least one bipartite core (or bobbin).

By this way, one object of the present invention is to provide a linear engine comprising a linear engine (for compressor) that can be directly attached to a compressor carcass.

An additional object of the present invention is to provide a linear compressor integrated by fixation means which allow for the direct fixation of linear engine to its carcass.

SUMMARY OF THE INVENTION

These and other objects of the presently disclosed invention are entirely achieved by means of the now disclosed linear engine for compressor, which comprises at least a stator consisting of a first core and a second core, and at least a cursor. Said first core further comprises at least a coil. The first core, cursor and second core are concentrically arranged.

In accordance with the present invention, a linear engine comprises a first core substantially defined by at least two different bodies, and attaching means between said two bodies. At least one of said two bodies defines at least a winding area of at least a coil, and said bodies can be physically coupled to one another.

Preferably, said bodies (forming the first core of said stator) are made of ferrous composite material and phenolic resin. Further preferably, one of said bodies (forming the first core of said stator) comprises a substantially toroidal prismatic geometry whereas the other body (forming the first core of said stator) comprises an integral body defined by at least two substantially cylindrical and concentrically disposed regions.

Also preferably, one of the attaching means comprises at least a hole disposed in at least one of the bodies (forming the first core of said stator), and the other attaching means comprises at least a protrusion located in at least one of said bodies (conforming the first core of said stator).

In this regard, and in accordance with the preferred embodiment of the present invention, one of said bodies (forming the first core of said stator) comprises at least a hole arranged in one of longitudinal edges thereof whereas the other of said bodies (forming the first core of said stator) comprises at least a protrusion arranged at one of longitudinal edges thereof. Also in this context, at least a hole disposed in one of said longitudinal edges of one of the bodies (forming the first core of said stator) and at least a protrusion disposed at one of said longitudinal edges of the other body (forming the first core of said stator) have equivalent diameters.

In accordance with the present invention, the compressor provided with a linear engine, as described above, comprises at least a first support acting as a connecting member between the engine cursor and at least a moving portion of the compressor and at least a second support acting as a connecting member between the first engine core and at least a portion fixed to the compressor carcass.

In this regard, said cursor is secured to the first support by means of an adhesive substance, and the first core is secured to the second support by means of an adhesive substance (the second support itself being attached to at least a portion fixed to said compressor carcass by means of an adhesive substance.

Preferably, both the first support and second support are made of non-metallic and non-magnetic material.

BRIEF DESCRIPTION OF DRAWINGS

The present invention will be described in details based on figures listed below, wherein.

DETAILED DESCRIPTION OF THE INVENTION

In accordance with the concept and objects of the present invention, a linear engine for compressor (hereunder only designated as engine 1) is disclosed.

Engine 1 comprises an electric motor capable of converting electric energy (applied to the stator coil) in axial movement (cursor displacement). Said engine 1 was specifically developed to be applied to linear compressors, particularly, to linear compressors based on resonant mass spring mechanisms. That is, said engine 1 was especially designed to (directly or indirectly) move a (not shown) piston that is capable of reciprocating axial displacement within a (not shown) cylinder.

Figure 1:
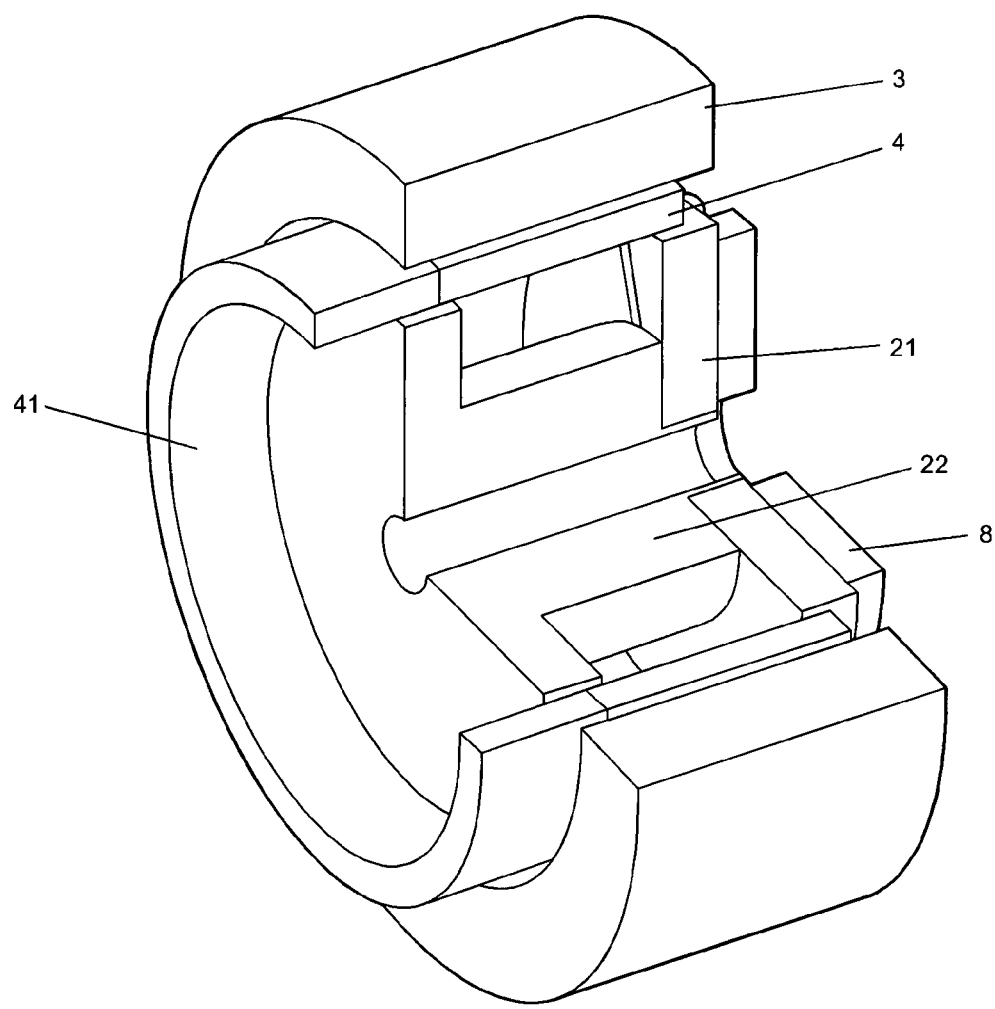
FIG. 1 illustrates a perspective cut view of the linear engine for compressor.
Figure 2:
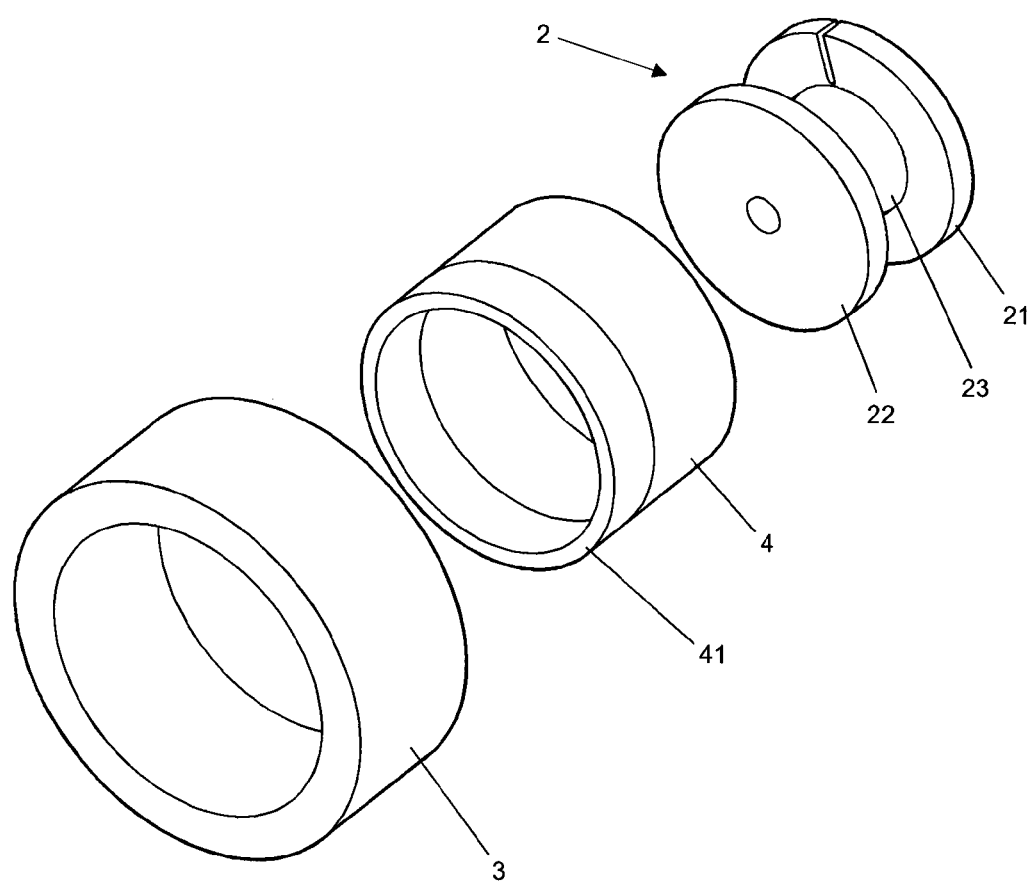
FIG. 2 is an exploded view of the linear engine for compressor.
Figure 3:
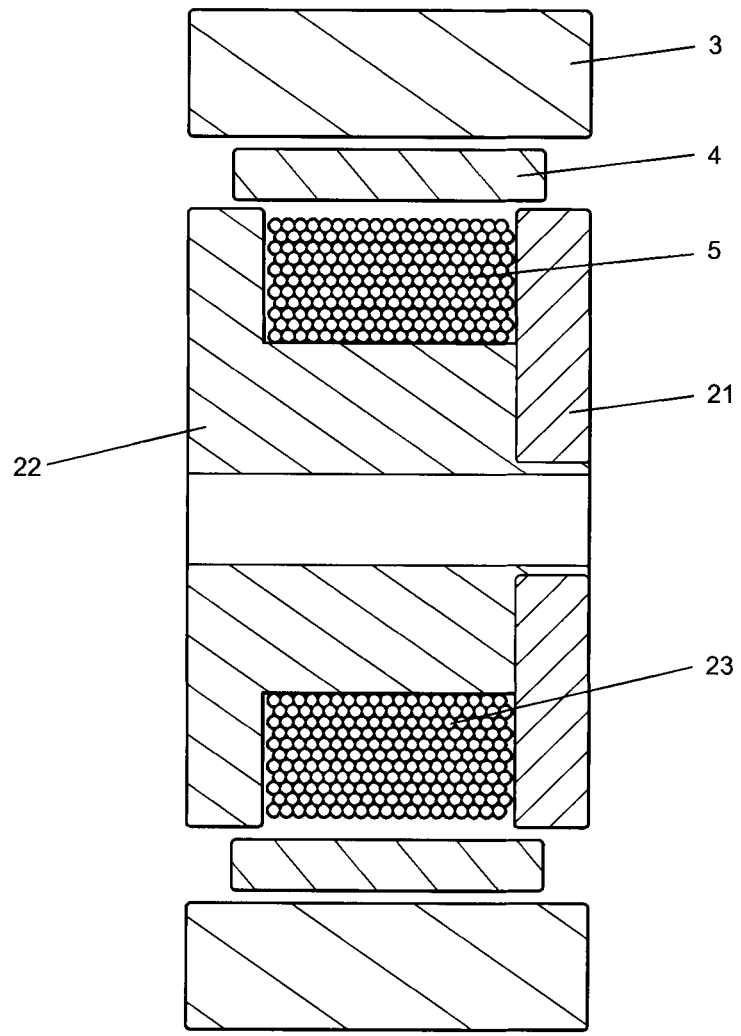
FIG. 3 is planned schematic cut view of the linear engine for compressor.
Figure 4:
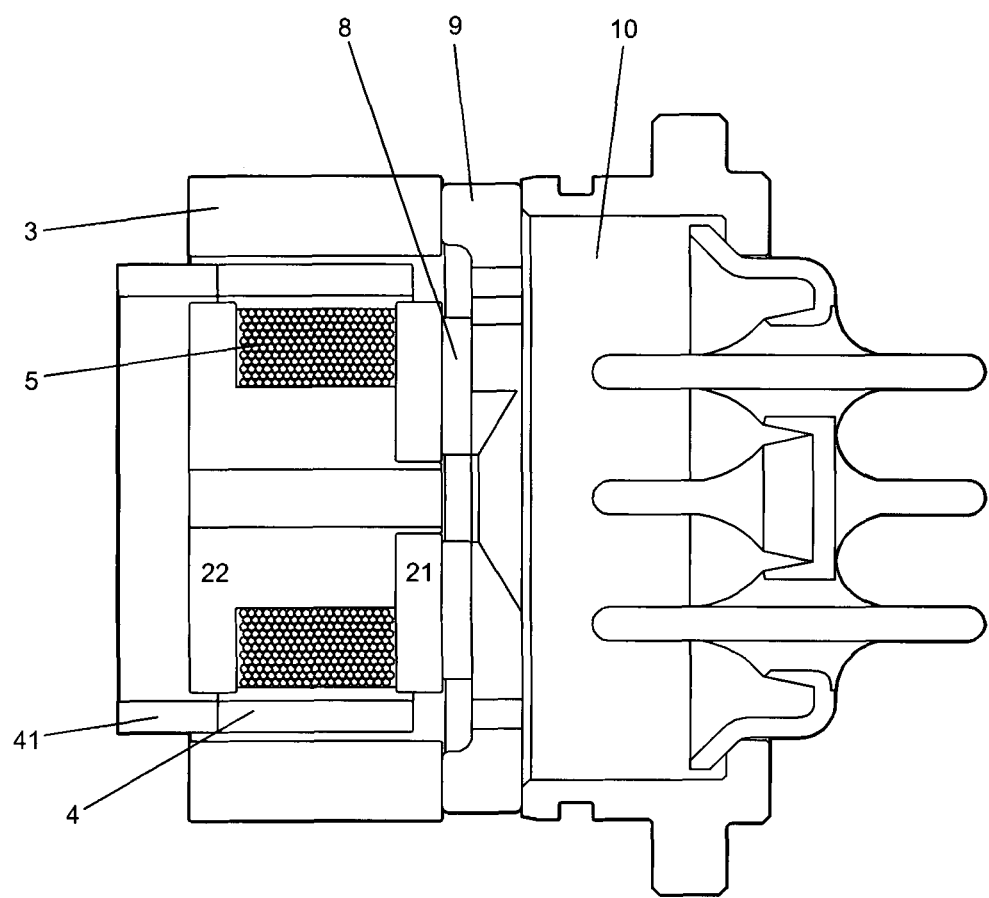
FIG. 4 illustrates a schematic cut of a compressor provided with a linear engine illustrated in figures above.
Figure 5:
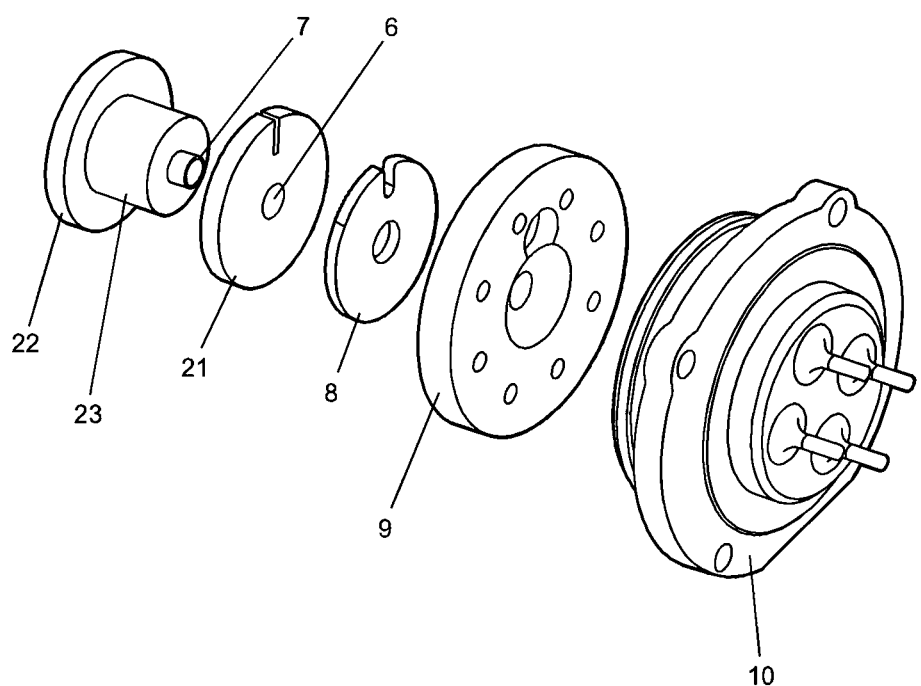
FIG. 5 illustrates a perspective exploded view of a preferred means for securing the linear engine to the compressor carcass.

FIGS. 1, 2, and 3 illustrate the preferred embodiment of said engine 1.

From these figures, one may infer that the referred to preferred embodiment of engine 1 is basically comprised of a stator (static portion of the engine) formed by a first core 2 and by a second core 3. Said engine 1 also consists of a cursor 4 (dynamic portion of the engine). The first core 2, cursor 4 and second core 3, following this order—from center to edge—, are concentrically disposed.

Said core 2 comprises one of the biggest differences of the present invention.

Said first core 2, which comprises the central core of the engine 1, consists of a bipartite body, that is, two bodies which are especially coupled to one another. By this way, a bipartite body is constituted by a first body 21 and a second body 22.

Said first body 21 comprises a body having circular perimeter having two substantially planned faces. Said body 21 further comprises a preferably, but not necessarily, through hole. Hence, it can be said that said first body 21 comprises a substantially annular prismatic form.

The second body 22 comprises a body including two substantially cylindrical regions, which are concentrically disposed and are of different (diameter and height) dimensions. Especially, the "lower region" of the second body 22 has shape and dimensions analogous to the shape and dimensions of said first body (excluding therefrom the central hole thereof). The "superior" region of the second body 22 is a cylindrical and bulging region. Moreover, it can be inferred that said "superior" region of the second body 22 also comprises a substantially cylindrical longitudinal protrusion 7.

Said central hole 6 of the first body 21 and said longitudinal protrusion 7 of the second body 22 have analogous dimensions, thereby forming the attaching means between said bodies 21 and 22.

By this way, it can be noted that the first core of the stator is defined by a bipartite body (being constituted by two bodies physically couplable to one another) having a shape analogous to a bobbin shape (defining a body with an "H"-like profile), defining an area 23 for winding a coil 5.

Preferably, the entire first core 2 of said stator (including therein bodies 21 and 22) is made of a ferrous composite material and phenolic resin, wherein this material is also known as SMC—Soft Magnetic Composite.

This preferred embodiment (and the main concept now built through same) already achieves one of the objects of the present invention, that is, it makes possible to build an engine 1 free of conventional sets of metal blades which define a coil winding region.

Moreover, the fact that the first core 2 of the stator is bipartite leads to many (process and functional) advantages, such as: Easy manufacture (sintering method), better use of the area designated to the coil, a coil can be shaped outside the "bobbin" so that same is associated subsequently with the latter, etc.

The second core 3 of the stator and cursor of engine 1 comprise substantially conventional members.

Hence, it can be noted that said second core 3 of the stator, which is a "return iron", comprises a metal body having a substantial annular prismatic form. Especially, said second core 3 of the stator 3 has a diameter higher than the diameter of the first core 2 of the stator and of the diameter of cursor 4.

Within this context, said cursor 4 comprises a preferably metallic and magnetically rigid body, in a substantially annular prismatic form. Magnetizing direction is preferably radial. Diameter of said cursor 4 is higher than the diameter of first core 2 of the stator and smaller than the diameter of second core 3 of the stator.

Cursor 4 and those moving portions of the compressor can be secured to one another by made of ceramic material. Said support 41 and said cursor 4 can be fixed to one another preferably by gluing between the two axial flat surfaces of the cited parts.

First core 2 and the compressor carcass 10 can be secured to one another by preferably gluing a support 8, made of a preferably annular non-metallic and non-magnetic material (preferably of a ceramic material). Especially, said support 8 acts as a connecting member between said first core 2 of the engine and at least a portion 9 fixed to the compressor carcass 10.

Since an example of the preferred embodiment of the objects of the present invention has been described, it should be construed that the scope thereof contemplates other possible variations, which are only limited by the content of the appended claims, including possible equivalent means.

The invention claimed is:

1. A linear engine for compressor, comprising a stator comprising a first core and a second core, and a cursor; wherein the first core further comprises a
coil, wherein the first core, the cursor and the second core are concentrically arranged, wherein
the linear engine for compressor comprises:
the first core defined by at least a first body and a second body;
attaching means between the first body and the second body;
at least one of the first body and the second body defining an area for winding a coil; and
the first body being physically couplable to the second body, wherein at least the first
body comprises an annular geometry;
a compressor comprising:
a first support acting as an attaching member between the cursor and at least one
moving portion of the compressor:
a second support acting as an attaching member between the first core of the linear engine and at least a portion fixed to a carcass of the compressor;
the cursor being attached to the first support by means of a first adhesive substance;
the first core being secured to a second support by means of a second adhesive substance; and
the second support being fixed to at least the portion fixed to the carcass of the compressor by means of a third adhesive substance.

2. The linear engine for compressor, in accordance with claim 1, wherein the first body and the second body are made of ferrous composite material and phenolic resin.

3. The linear engine for compressor, in accordance with claim 1, wherein the first body comprises a body of annular prismatic geometry.

4. The linear engine for compressor, in accordance with claim 3, wherein the first body has a hole disposed in a face of the first body.

5. The linear engine for compressor, in accordance with claim 1, wherein the second body comprises an integral body defined by at least two cylindrical and concentrically disposed regions.

6. The linear engine for compressor, in accordance with claim 1, wherein at least a portion of the attaching means comprises a hole disposed in at least one of the first body and the second body.

7. The linear engine for compressor, in accordance with claim 1, wherein at least a portion of the attaching means comprises a protrusion disposed in at least one of the first body and the second body.

8. The linear engine for compressor, in accordance with claim 7, wherein the second body has a protrusion disposed in a longitudinal edge of the second body.

9. The compressor, according to claim 1, wherein the first support is made of non-metallic and non-magnetic material.

10. The compressor, according to claim 1, wherein the second support is made of non-metallic and non-magnetic material.

* * * * *